(12) United States Patent
Essling et al.

(10) Patent No.: US 7,394,527 B2
(45) Date of Patent: Jul. 1, 2008

(54) MEASURING DEVICE AND MEASURING METHOD FOR DETERMINING DISTANCE AND/OR POSITION

(75) Inventors: Mirko Essling, Kaiserslautern (DE); Michael Kasper, Kaiserslautern (DE); Klaus-Werner Joerg, Schopp (DE)

(73) Assignee: AndroTec GmbH (DE)

( * ) Notice: Subject to any disclaimer, the term of this patent is extended or adjusted under 35 U.S.C. 154(b) by 0 days.

(21) Appl. No.: 11/510,948

(22) Filed: Aug. 28, 2006

(65) Prior Publication Data

US 2007/0024845 A1 Feb. 1, 2007

Related U.S. Application Data

(62) Division of application No. 10/343,538, filed as application No. PCT/EP01/08841 on Jul. 31, 2001, now Pat. No. 7,110,092.

(30) Foreign Application Priority Data

Aug. 1, 2000 (DE) ............... 100 37 853
Nov. 29, 2000 (DE) ............... 100 59 240

(51) Int. Cl.
*G01C 3/08* (2006.01)
(52) U.S. Cl. ............... 356/4.01; 356/5.01; 356/141.2
(58) Field of Classification Search ............... 356/4.07, 356/5.01, 139.03, 141.1, 141.4, 4.01, 141.2
See application file for complete search history.

(56) References Cited

U.S. PATENT DOCUMENTS

| | | |
|---|---|---|
| 2,830,487 A | 4/1958 | Griffith |
| 3,687,556 A | 8/1972 | Price et al. |
| 4,268,167 A | 5/1981 | Alderman |
| 4,818,107 A | 4/1989 | Ono et al. |
| 4,820,041 A * | 4/1989 | Davidson et al. ............ 356/3.12 |
| 4,907,874 A | 3/1990 | Ake |
| 4,911,548 A | 3/1990 | Keren-Gill |
| 4,926,050 A | 5/1990 | Shemwell |
| 5,100,229 A * | 3/1992 | Lundberg et al. ........... 356/3.12 |
| 5,110,202 A | 5/1992 | Dornbusch et al. |
| 5,189,484 A | 2/1993 | Koschmann et al. |
| 5,243,397 A | 9/1993 | Friedland |
| 5,247,487 A | 9/1993 | Beliveau et al. |
| 5,294,970 A * | 3/1994 | Dornbusch et al. ........ 356/141.1 |
| 5,742,069 A | 4/1998 | Steenwyk et al. |
| 5,742,394 A | 4/1998 | Hansen |
| 5,949,530 A | 9/1999 | Wetteborn |
| 6,066,846 A * | 5/2000 | Takada et al. ............... 250/236 |
| 6,166,802 A | 12/2000 | Kodaira et al. |
| 6,286,607 B1 * | 9/2001 | Ohtomo et al. .............. 172/4.5 |
| 6,292,258 B1 | 9/2001 | D'Alessandro et al. |
| 6,337,473 B2 | 1/2002 | Yamazaki et al. |
| 6,366,395 B1 | 4/2002 | Drake et al. |
| 6,396,571 B2 | 5/2002 | Ohtomo et al. |
| 6,473,167 B1 * | 10/2002 | Odell ...................... 356/141.4 |

(Continued)

*Primary Examiner*—Isam Alsomiri
(74) *Attorney, Agent, or Firm*—Frederick H. Gribbell

(57) ABSTRACT

A measuring device is provided with a signal generator and a signal receiver, which is located at a measurable distance from the signal generator. The signal generator is designed for the emission of at least two signal beams covering in given relationship to each other an area and the signal receiver is designed for the time-resolved reception of the signal beams in such a manner that the generator-receiver distance can be determined from the time signature of the signal beam reception.

16 Claims, 7 Drawing Sheets

U.S. PATENT DOCUMENTS

| | | |
|---|---|---|
| 6,545,751 B2 | 4/2003 | Beliveau et al. |
| 6,573,981 B2 | 6/2003 | Kumagai et al. |
| 6,618,133 B2 | 9/2003 | Hedges et al. |
| 6,665,067 B2 | 12/2003 | Ogawa et al. |
| 2002/0057426 A1* | 5/2002 | Ohtomo et al. .......... 356/141.4 |
| 2003/0025902 A1* | 2/2003 | Hedges et al. ........... 356/141.4 |

* cited by examiner

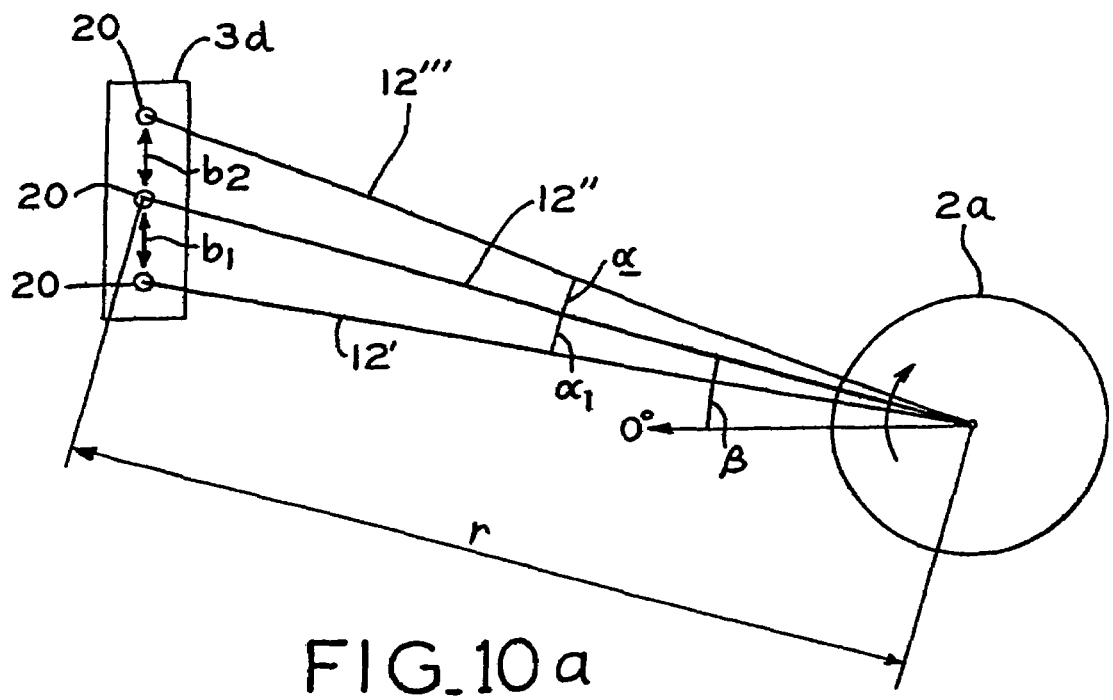
FIG_10a
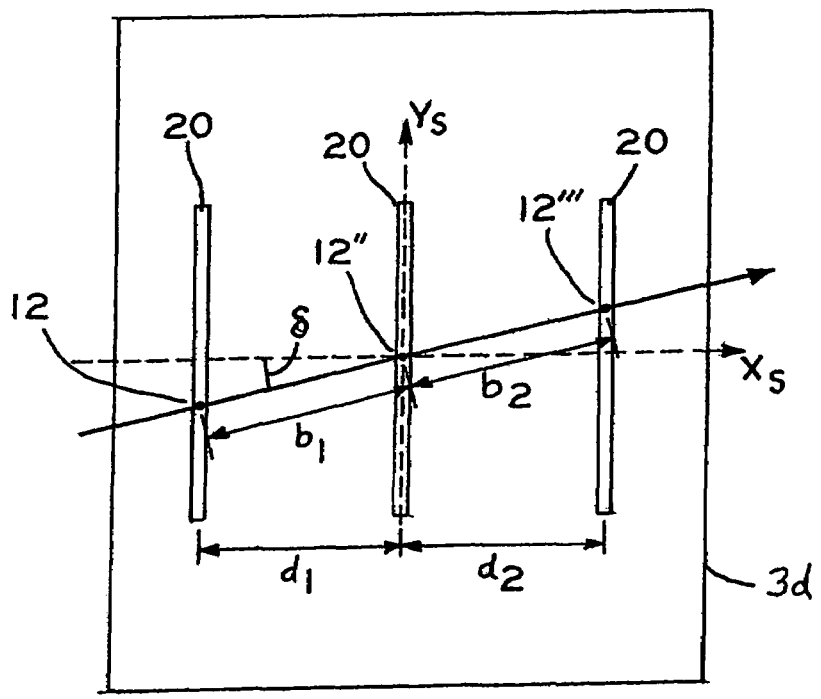
FIG_10b

MEASURING DEVICE AND MEASURING METHOD FOR DETERMINING DISTANCE AND/OR POSITION

CROSS-REFERENCE TO RELATED APPLICATIONS

The present application is a divisional application of application Ser. No. 10/343,538, titled "MEASURING DEVICE AND MEASURING METHOD FOR DETERMINING DISTANCE AND/OR POSITION," filed on Jan. 31, 2003, now U.S. Pat. No. 7,110,092, which claims priority to PCT patent application No. PCT/EP01/08841, filed on Jul. 31, 2001, which claims priority to German patent application No. 100 59240.6, filed on Nov. 29, 2000 and (German patent application No. 100 37 853.6, filed on Aug. 1, 2000.

BACKGROUND (1) Field of the Invention

The present invention relates to the characterizing clauses of the independent claims. With these the invention generally deals with determining distances and/or positions.

(2) Description of Related Art

It is frequently necessary to be able to measure comparatively short distances in the range of several centimeters up to several hundred meters fast and very precise. Applications for this are for example measuring existing real estates, the measurement of properties, during the construction of houses, as well as measuring distances of mobile machinery, for example transport systems in industrial halls, whose distance from walls or such must be determined, in order to stop the movement if necessary before a collision occurs.

Beyond that it is often not only necessary to determine the distance for a point of reference but also to determine a relative position to this point of reference depending upon application in two or three dimensions, i.e. typically the position on an area or in addition also the height.

Now different methods are suggested, in order to deal with these measuring tasks.

Thus for example the U.S. Pat. No. 5,949,530 suggests a method, which emits a pulsed laser beam and determines the distance to a distant object from the running time of the backscattered pulse. Systems of this type are already used in industrial applications, they are however expensive, as the running times of the light pulses are short and a gating electronic operating at high frequency operating is required, which must respond accordingly quickly.

Further arrangements are well-known, in which signals are modulated on signal beams and a value related to the modulation, e.g. the phase, is used for the determination of the distance to the signal generator.

Apart from the described timing of the interval between transmission and echo-return and the phase measurement with suitable modulated laser light further methods are well-known like the active triangulation, with which e.g. backscattered laser light is detected with a position-sensitive detector (PSD), in order to conclude the distance to the object points from the position of a light spot imaged on this detector.

Further arrangements are well-known with which a light emitter is aligned accurately to the vertical lie, in order to then emit a light beam along a horizontal line or a system of coordinates as reference. Hereby measurements can be facilitated, however they cannot be taken easily.

SUMMARY

The task of the present invention is to make the latest available for the commercial application.

The solution of this task according to the invention is claimed in independent form, preferable embodiments can be found in the sub claims.

Thus the invention suggests first that in a measuring device with a signal generator and a signal receiver, which is located at a measurable distance from said signal generator, it is intended that the signal generator is designed for the emission of at least two signal beams covering in given relationship to each other an area and the signal receivers is designed for the time-resolved reception of signal beams in such a manner that the generator-receiver distance can be determined from the time signature of the signal beam reception.

A first substantial aspect uses thereby the fact that a reception signature is received at the signal receiver by the given relationship of two separate signal beams to each other, which are moved in a given way over an area. The distance to the signal generator can be concluded from said reception signature.

The measurement principle implemented thereby can be understood best, without limiting the invention to this special case, for two parallel to each other emitted laser beams, which rotate together symmetrical around an axis, whereby the rotation axis is to be normal to the plane defined by the laser beams.

Due to the symmetrical rotation a laser beam requires at each distance to the rotation axis always the same time in order to rotate once completely. The length of the peripheral circle however, which the laser scans during a complete rotation, increases in a plausible way with the distance to the rotation axis.

Now with parallel emission of the laser beams their distance is equal in each distance to the rotation axis. However, this distance is scanned faster at a larger distance to the axis, as the laser distance far away from the axis constitutes a smaller fraction of the circumference. The time, which the second laser requires, in order to reach the position, at which the first laser was detected before, is thereby reduced if the distance to the axis increases.

This measurement principle however is limited neither exclusively to laser light, nor to only two, nor to accurately parallel aligned beams. Measurements can be conducted also with emitted beams tilted to each other, skew beams or intersecting beams; it is also possible to intend a non-symmetrical rotation, for example in order to scan non-interesting areas faster or to be able to detect with a fixed installation of the signal generator, e.g. in an industrial hall, certain areas with increased resolution.

It is possible to use a set of different beams e.g. ultrasonic beams. It is however preferred, if light beams are emitted as signal beams, as this especially simplifies the control and adjustment of the device. The use of laser light beams is particularly preferable, since laser light sources are available, are inexpensive and emit with only low divergence.

The signal beams can be made to scan an area in different ways. It is particularly preferable, if they rotate around an axis. For this the sources of light can be arranged on a turntable or they can radiate on a turning optics. In such a case the signal beams will not intersect at the rotation axis; the analysis of the signals is simplified, if at least two of the signal beams are emitted generally parallel to each other. However it is possible without problems to correct to other beam geometries.

In a particularly preferred variation more than two signal beams are emitted. The signal beams can be emitted as general signal beam fans, whereby at least the plane created by a single fan exhibits at least one component parallel to the rotation axis and is situated preferably generally parallel to said plane. This permits the use of detectors in the signal receiver, which do not have to be arranged at a certain height, in order to receive a signal, even if they are designed punctiformly. Although a fan-like emission of other beams is also possible, for purely linguistic reasons in the following it is only referred to the light fan.

Preferably a third light fan can be intended, which runs diagonally between two fans that surrounding it and which are generally rotational parallel to their axes. The time, which generally passes between the pass of the two generally rotational parallel to their axes light fans, depends here only on the distance of the measurement location to the rotation axis. Dependent on the height, in which the signals of the three fans are received, varies both the time, which passes between the pass of the first, generally rotational parallel to their axes and the diagonal light fan, as well as the time, which passes between the pass of the diagonal light fan and the second, generally rotational parallel to their axes light fan; if the first time increases, the second time decreases accordingly, and reversed. Thus the height can be concluded from the time analysis.

It is particularly preferable, if the measuring device exhibits a means for the determination of a signal beam zero-angle passage.

This permits the reference to a zero-angle reference axis, which prepares a set of polar coordinates at each measuring point by using the distance to the rotation axis.

The synchronization to the zero passage can take place by modulation of the signal beams (e.g. laser beams) for instance with time information, by means of reference to an external time standard like a DCF-time signal or network humming and/or a reference to a common internal and/or external time or cycle reference.

A zero-angle reference can be generated also by a single and/or multiple synchronization of a receiver clock to the rotation speed of the laser unit and a following, continuous timing.

Furthermore a in particular wireless data communications device can be intended for the interchange of information between the units, in particular the time information and/or the zero-angle passage information.

It is preferable, if the measuring device comprises further a means, in order to determine Cartesian coordinates (x, y) from the distance to the signal generator (r) and the reference to the signal beam zero-angle passage (phi). The conversion can occur in the signal receiver, in order to indicate directly there a given xy and respectively z-coordinate.

If the time signal evaluation occurs at least partially in the signal receiver, it is preferable, if a multiplicity of coordinates can be stored in said signal receiver and/or can be transferred in particular to a central processing unit and/or a data processing unit.

It is in particular preferable for the signal receiver with light beams as signal beams, if it exhibits at least one photosensitive component, which receives light from a light conductor, whereby its surface can be designed for the coupling of light hitting the lateral surface in particular by dispersion.

It is particularly preferable, if a photo sensor is intended on both ends of the light conductor; then one receives alternatively a redundancy and increased failure security and/or the possibility to conclude the point of impact of a light beam interspersed into the light conductor from a signal strength comparison at the first and second photo sensor. This can be used for height determination for example when assembling mobile robots and/or for leveling work on construction sites, assuming that the height of the receivers above ground is known.

In an alternative way it is possible, to use a signal receiver with several integrated signal beam detectors located in a fixed distance to each other in place of two or several moving signal beams, which are emitted to each other in a given spatial relationship. A distance to one point of reference can now be also concluded from the time course of the signals created on the different signal beam detectors by that at least one signal beam. The idea that a given angular velocity leads to scan times varying with the radius dependent on the distance to the rotation axis is used also here. It is here preferable to use again rod-shaped light receivers, e.g. light detectors at light conductors, into which light can be coupled by interference. Preferably at least three of such light conductors are used at the same time. This makes it possible to detect and compensate for a diagonal tilt of the signal receiver. A diagonal tilt by rotating against the tangent of the scanned circle can be assumed thereby in particular if with equidistantly arranged signal beam detectors the reception time differences deviate from the first to the second signal beam detector and from the second to the third signal beam detector significantly from each other. A diagonal tilt against the rotation axis however can be detected, if the individual signal beam detectors are height sensitive, e.g. through position-sensitive detectors (PSDs) and/or light conductors scanned for intensity on both sides, into which light can be coupled by interference. It is also favorable when using several signal beams at the same time to designate several, e.g. two, signal receivers located at a measurable distance from each other; with these preferably the three-dimensional orientation of an object, at which they are arranged, can being determined.

BRIEF DESCRIPTION OF THE DRAWINGS

The invention is described following only in examples using the drawings. Shown is/are:

FIG. 10 a further variation.

DETAILED DESCRIPTION

Figure 1:
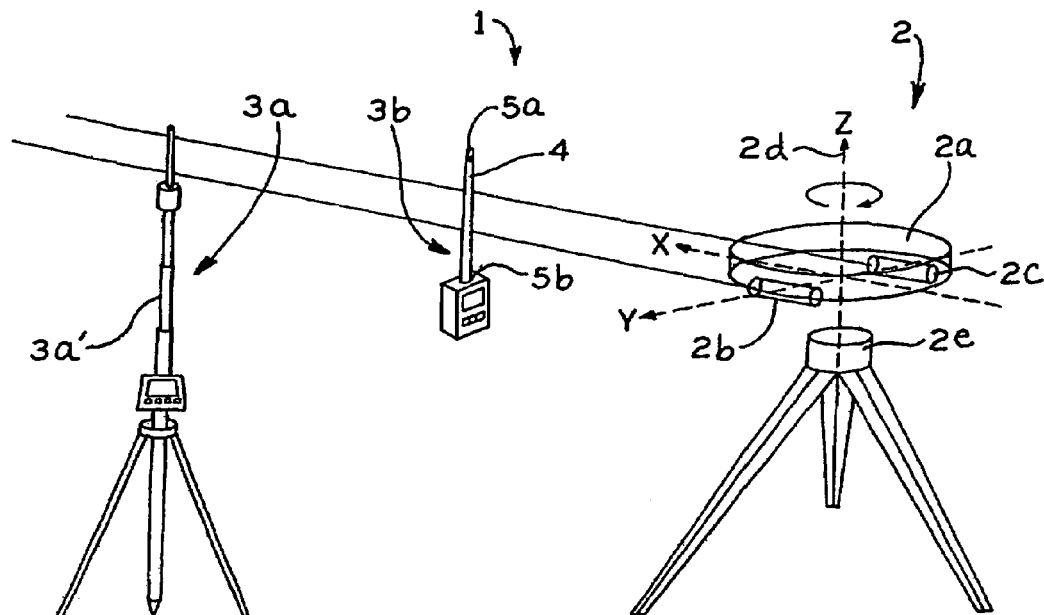
FIG. 1 a draft for the representation of a measuring device according to the invention.

According to FIG. 1 a measuring device for local position determination, generally denoted with 1, comprises a signal generator 2 and several signal receivers 3a, 3b located at a measurable distance from said signal generator.

The signal generator 2 comprises a platform 2a, on which two laser light sources 2b, 2c are located for the emission of generally parallel signal beams. The lasers 2b, 2c can be rotated around a rotation axis 2d together with the platform 2a by a drive unit 2e with controlled, constant speed; said rotation axis runs generally vertically and is normal to the generally parallel laser beams.

A radio signal generator, which beams a signal referred to the point in time $t_0$ of a zero-angle passage is not shown.

The first signal receiver 3a is a stationary signal receiver, while the second shown signal receiver 3b is a handheld signal receiver. Generally it is possible to use practically as many receivers at the same time as desired. The two signal receivers 3a, 3b have 360°-characteristics, which means they can receive light from all directions. They comprise a light conductor 4; its surface is provided with a dispersing coating and each end of the light conductor exhibits a photodiode 5a, 5b as the photo-sensitive component. Signal receiver 3a or 3b comprises also a radio receiver 6e (see FIG. 2a), which is designed for the reception of the signal emitted from the signal generator referred to the zero-angle passage.

Figure 2A:
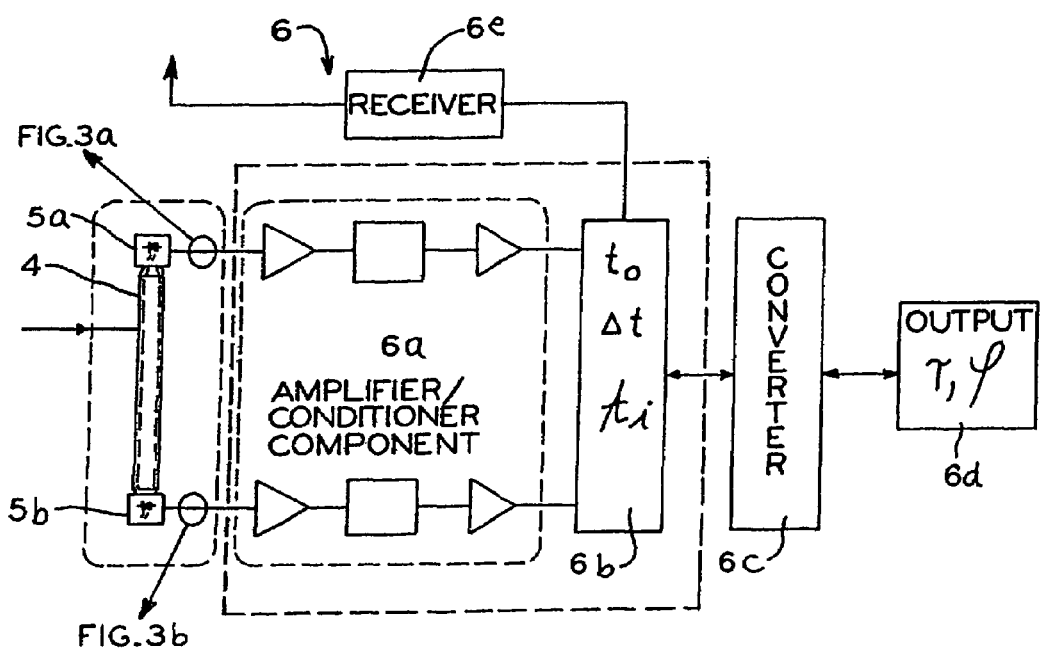
FIG. 2a a first principle draft for the representation of a gating electronic of a measuring device according to the invention.
Figure 3A:
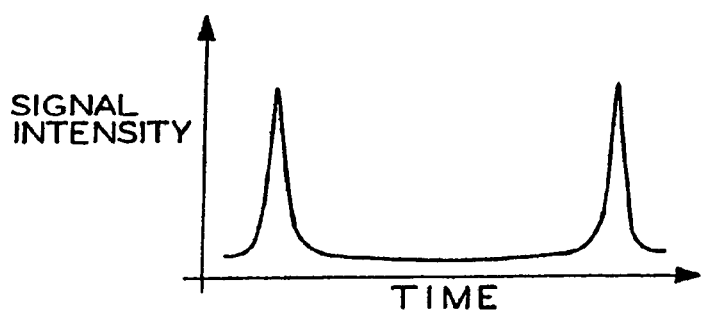
FIGS. 3a, b signals at the two diodes of the signal receiver.
Figure 3B:
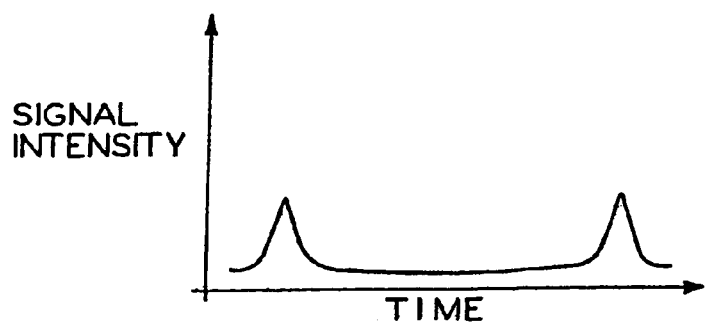

Referring now to FIG. 2a, signal lines lead from the photodiodes 5a, 5b to a signal processing circuit 6 including component 6a, which is designed to first amplify the signals and condition them in such a way that the status, in which a signal beam is coupled into the light conductor, can be identified and be detected regarding its temporal position $t_1$, relative to the time of the zero-angle passage $t_0$. The signal processing circuit 6 is designed further to determine the time difference $\Delta t$ (FIG. 3) from sequential photodiode pulses and to derive from this further information using measuring device 6b. For this, converter 6c is present, which is designed to determine an angle coordinate $\phi$ relative to the point of zero-angle transit time $t_0$ from the temporal position of $t_1$ of the corresponding photodiode pulses and to output it to output 6d, and which is further designed to determine from the time difference $\Delta t$ a distance to the signal generator. The results from converter 6c are given to output 6d, with which the result can be displayed locally on a display.

The arrangement of FIG. 1 is used as follows:

First the drive unit 2e is excited, until the desired constant speed around the rotation axis 2d is controlled. Then the signal generators 2 are excited. This creates pulses in the photodiodes 5 of the signal receiver 3b, if these are hit by the signal beams. These signals belonging to the pulses become amplified and conditioned.

Now the time signature of the signal generator reception is determined with the signal receiver 3b. First the temporal distance of the detected signals is determined and from this the distance between signal receiver and rotation axis is determined.

It is taken advantage of the fact that a laser beam through symmetrical rotation requires in each distance to the rotation axis always the same time, in order to rotate once completely, at the same time however the length of the periphery circle, which the laser scans with a complete rotation, increases with the distance of the rotation axis. Since with parallel emission of the laser beams their distance is the same in each distance to the rotation axis, this distance however is covered faster at a larger distance to the axis, since the laser distance far away from the axis constitutes a smaller fraction of the periphery. The time, which the second laser requires, in order to reach the position, at which the first laser was detected before, is thereby reduced if the distance to the axis increases. A value referred to the reciprocal value results therefore in a value characterizing the distance to the rotation axis.

Therefore first a size reciprocal to the temporal distance of the detected signals is calculated and then the distance to the rotation axis is determined by referring to a value that describes the geometrical arrangement of the emitted signal beams and the fixed rotational frequency.

The time difference $\Delta t$ is thereby converted in converter 6c to a distance to the signal generator and is given to output 6d, which displays the result locally on a display.

The angle coordinate $\phi$ is then determined relative to the time of zero-angle passage $t_0$ from the temporal position $t_1$ of the respective photodiode pulses and is output at output 6d.

It is to be mentioned that light conductors 4 at signal receiver 3 can be designed in different ways for the light coupling. This is shown in FIGS. 4a-4f.

Figure 4A:
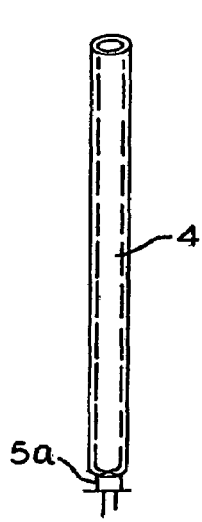
FIG. 4 a detail of a signal receiver.

In FIG. 4a a light conductor is shown, its surface is provided with a dispersing coating and a photodiode is intended at its lower end.

Figure 4B:
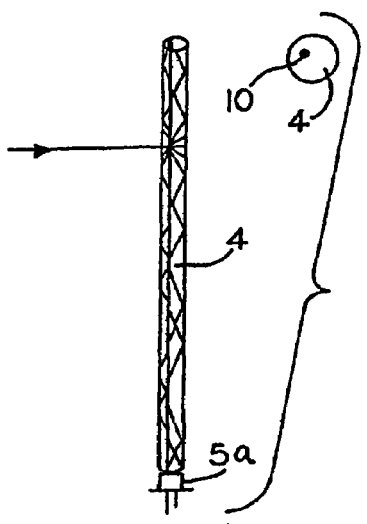
Figure 4C:
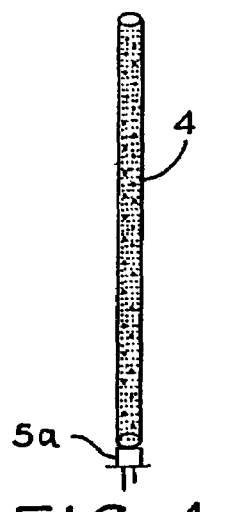
Figure 4D:
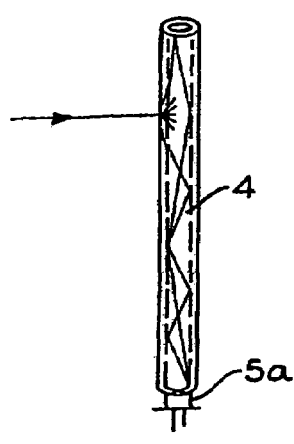

Alternatively FIG. 4b shows the use of a dispersing core 20 on the inside of light conductor 4 and/or wave guide. The path of the beams is sketched. Light conductor 4 shown in FIG. 4c uses dispersing particles for the coupling of the laser light. With light conductor 4 shown in FIG. 4d, a reflection layer located at one end serves the purpose of signal amplification in particular with longer light conductors. FIG. 4e shows on the contrary to FIG. 4a a partially surface covering dispersing layer 21. Here the light is coupled preferably through light conductor 4 from the side opposite to dispersing layer 21.

Figure 4F:
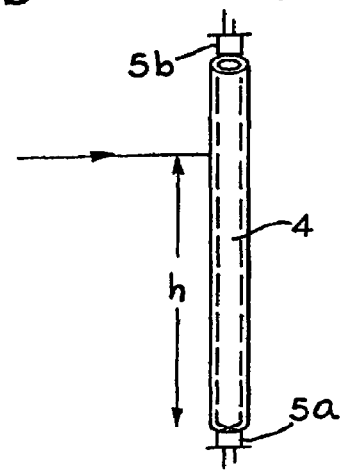
Figure 4E:
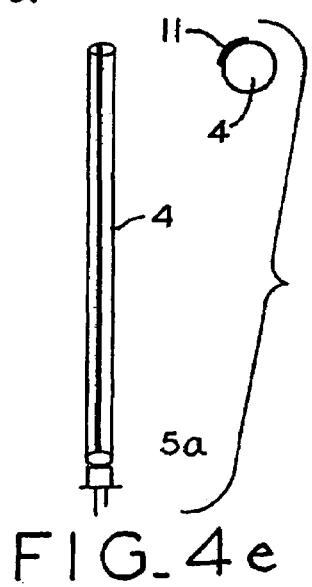

FIG. 4f shows a particularly preferred variation of light conductor 4, which makes it possible to determine the position of the point of impact of the laser beams by the use of two photodiodes 5a and 5b at both ends of light conductor 4. Light conductor 4 according to FIG. 4f is used thereby for the stationary signal receiver 3a (FIG. 1), as thereby in connection with the measurable deflection of an integrated telescope measuring pole 3a', a height measurement (leveling) is possible.

Figure 5:
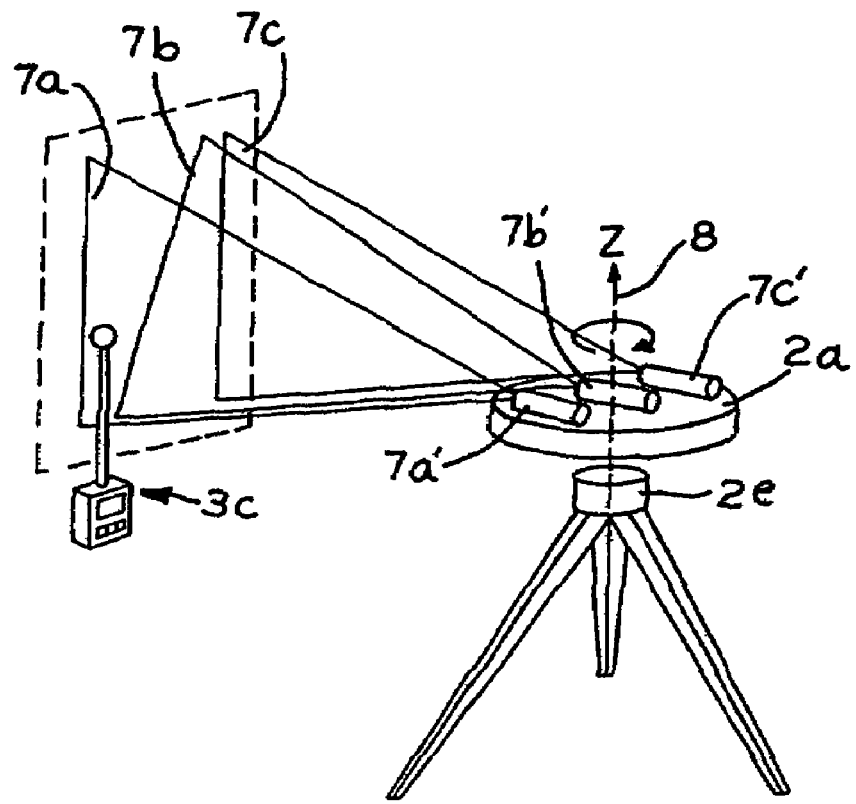
FIG. 5 a principle draft of a further measuring device according to the invention.
Figure 6:
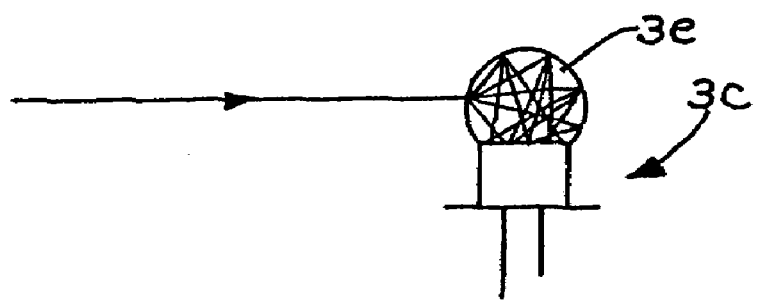
FIG. 6 details of signal receivers.

The design example of FIG. 5 shows an enhancement of the invention previously described for the determination of three-dimensional coordinates. First of all deviating from the previous design example no light beams are emitted, but light fans 7a, 7b, 7c are emitted from light fan emitters 7a', 7b', and 7c', respectively. The two edge fans 7a, 7c are thereby generally parallel to each other and to the rotation axis 8; middle light fan 7b is tilted against the two light fans 7a, 7c. The platform is again provided with a zero-angle reference, which outputs an additional radio signal to the signal receiver 3c each time an arbitrarily defined zero-angle is scanned. The signal receiver 3c exhibits an at least essentially punctiform light coupling area 3e (FIG. 6).

With this arrangement three-dimensional coordinate determinations can be executed as follows: First, as previously described, the time signature of the measuring signal reception is determined and the distance to the rotation axis is concluded from the distance of the passage of both outer light fans 7a and 7c. As previously described, the angle position of signal receiver 3c relative to the arbitrary zero-angle is determined by reference to the determination of scanning the zero-angle passage, in accordance with radio signal transfer. In addition, it is now determined, in which ratio the period between the passage of two outer light fans 7a, 7c is divided by middle, diagonally tilted light fan 7b. It can be clearly understood that this relation is representative for the height (with given radius), which is calculated as coordinate z. This way a set of coordinates r, phi, z is determined. These cylindrical coordinates are then converted into Cartesian coordinates.

Figure 7:
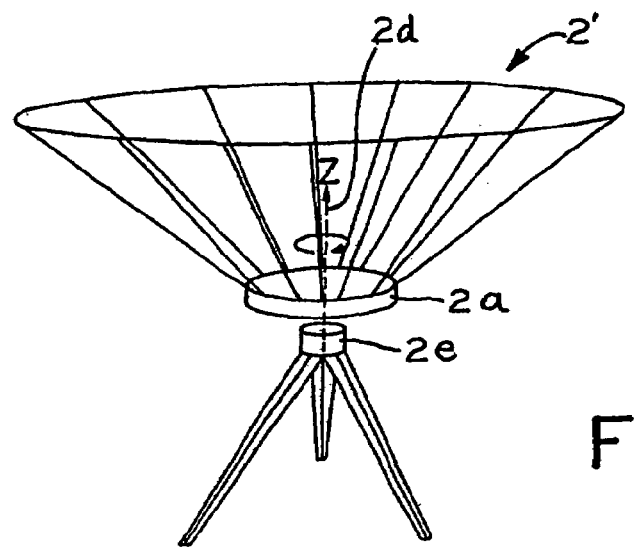
FIG. 7 an alternative beam geometry.

While according to the example in FIG. 1 the laser beams were emitted generally normal to the rotation axis, this is not mandatory. Rather it is also possible to choose a conical emission in place of a plane emission, as shown by signal generator 2' in FIG. 7.

Figure 8A:
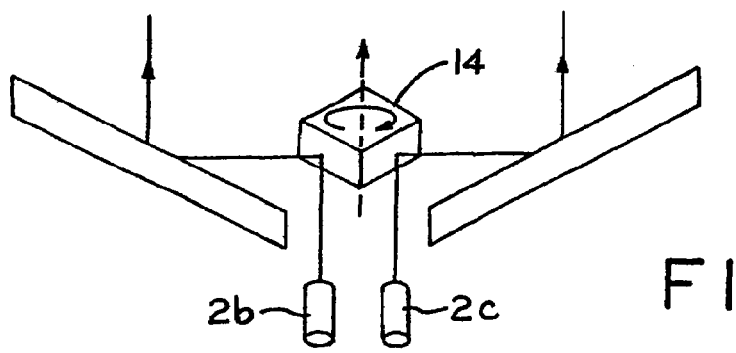
FIG. 8 different variations for the design of the signal generator according to the invention.

While it was previously described that the lasers themselves are rotated as sources of signal beams, this is not mandatory. Referring now to FIG. 8a, it is also possible to direct the laser beam toward a rotating mirror or similar device, such as rotating mirror 14. In the case of rotation of a polygon the beams move somewhat apart, what can be compensated during the analysis, however very high speeds can be achieved. Furthermore it is possible to intend only scanning of a certain area, for example by a periodic to-and-fro swiveling instead of a complete rotation of lasers 2b and 2c and/or rotating visual components.

Figure 8B:
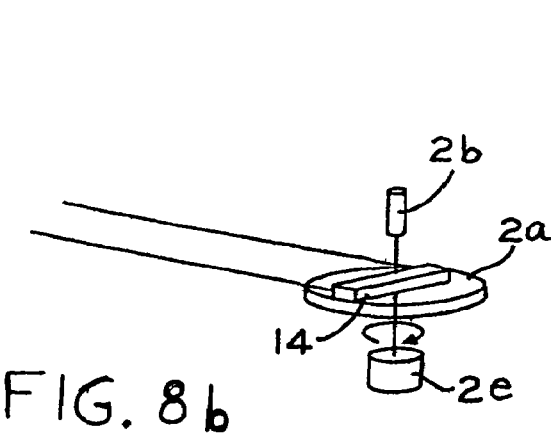
Figure 8C:
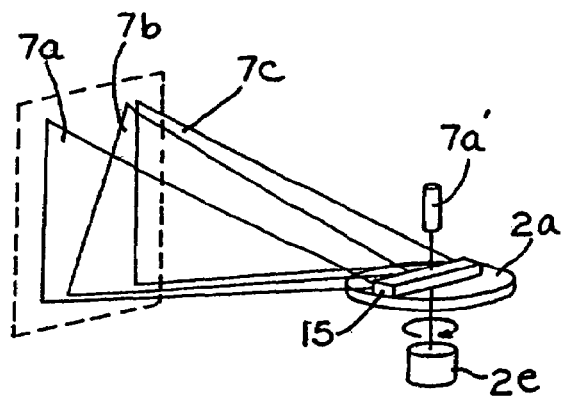

As shown in FIG. 8b, it is also possible to divide a single laser beam, i.e., from laser 2b, into several signal beams by a beam splitter arrangement, such as beam splitter 14 located on platform 2a at rotation axis 2d. Similarly, as shown in FIG. 8c, it is possible to divide a single light fan from light fan emitter 7a' into several light fans 7a, 7b, 7c by beam splitter 15 located on platform 2a at rotation axis 2d.

Figure 9A:
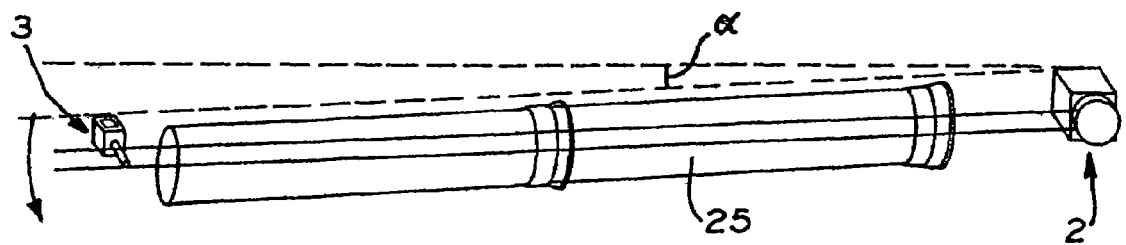
FIG. 9 examples of applications.

The measuring device can be used for example in one of its arrangements with self-contained mobile robots, with transport systems without driver, with applications of robotics or for machinery control, or with constructional surveying technology and replaces and/or completes there conventional electronic measure tapes, like laser distance meters or ultrasonic distance meters, stationary or rotary leveling lasers, in particular also leveling lasers with adjustable inclination (e.g. rotation laser with two inclination axes, canal construction lasers), visual leveling instruments, in particular digital leveling instruments, optical and/or electronic theodolites and total stations. Furthermore it is possible to use the measuring device according to the invention for measuring and staking out of building ground plans for new buildings (preparation of batter boards), for surveying work of construction sites, for example for checking the construction against the plan (accuracy to size) as well as for area calculation, for surveying of existing buildings for subsequent area calculations or for examination of individual measurements of a building, for manual transferring of plan data (in particular CAD data) to a background (floor, wall, ceiling) for construction industry, industry, landscaping, building of fairs, etc., measuring of markings during sports events, measuring of achieved distances during sports events for example in the disciplines javelin-throw, hammer-throw, shot-put, broad jump, etc., surveying/design of vehicles (ships, airplanes, etc.), use as tracking systems for virtual reality systems, in particular for so-called virtual studios, for canal construction, for example for laying pipe 25, as shown in FIG. 9a.

Furthermore it is possible to support the generating of environmental models for mobile applications of robotics. A further application is to determine the position of mobile service robots. In particular for all types of the surface covering ground work, for example building cleaning, lawn maintenance, installation of floor tile, mine search (humanitarian demining), etc.

Figure 9B:
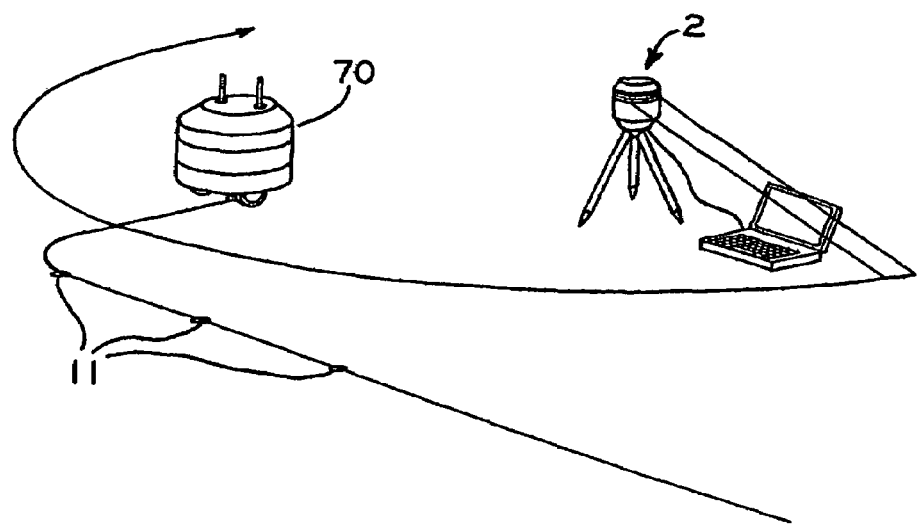

A particularly preferred variation intends that a mobile system is provided with a measuring device on the one hand and with a marker transmitter on the other hand, that triggers certain positions and sets markings when reaching said positions for example in order to transfer CAD floor plans 1:1. Referring now to FIG. 9b, the actual position of a mobile robot 10 is determined repeatedly; then with consideration of the same actual position desired positions are approached—and markings 11 set on these as required.

It is to be pointed out that through the use of several signal generators both the area coverage as well as the measuring accuracy can be increased. Further it is explained that an overall system can consist of one or more signal generators and of one or more receivers (position detectors), whereby almost as many as desired receivers can be used at the same time and operated independently from each other, as long as the direct line of visual connection between the scanner unit and a receiver is preserved for a sufficient number of beams, usually two. Independently of the individual application thereby a multiplicity of receivers can be operated at the same time, so that manual measuring of several coworkers or the controlling of several machines at the same time becomes possible, which is favorable in industrial halls, in order to route transport systems without driver. From this result a substantial time gain and a substantial cost saving, because only one station permanently installed is required at the same time and contrary to the use of theodolites only the relatively inexpensive receivers have to be present manifold.

The models of the possible receivers extend from simple x/y-displays with one-button operation up to comfortable measuring poles with integrated small computers, so-called Personal Digital Assistant—PDAs, which offer software interfaces to common CAD-programs.

Because the measuring accuracy at larger distances is determined particularly by the temporal resolution of the measurement of the distance between the pulses, the accuracy can be increased by multiple measurements and following averaging. This is also favorable for correcting measured values with air turbulences etc., in particular for measurements in a large distance to the signal generator.

The zero-angle passage can be generated by the receiver different than previously described also by a one-time synchronization of a receiver clock to the rotation speed of the laser unit and a following, continuous timing.

Particular wireless data communications equipment for the exchange of information between the units can be intended.

LCD indicators or the like can be intended in the receivers, in order to indicate the position directly.

It is to be pointed out that the light conductors, designated at the signal receivers, into which light is laterally coupled by dispersion and/or with which on both ends of the light conductor an photo-sensitive component is intended, offer also benefits independently of the use of the arrangement according to the invention. This arrangement can be used in particular for the measuring of altitudes, also with conventional rotation lasers.

Figure 2B:
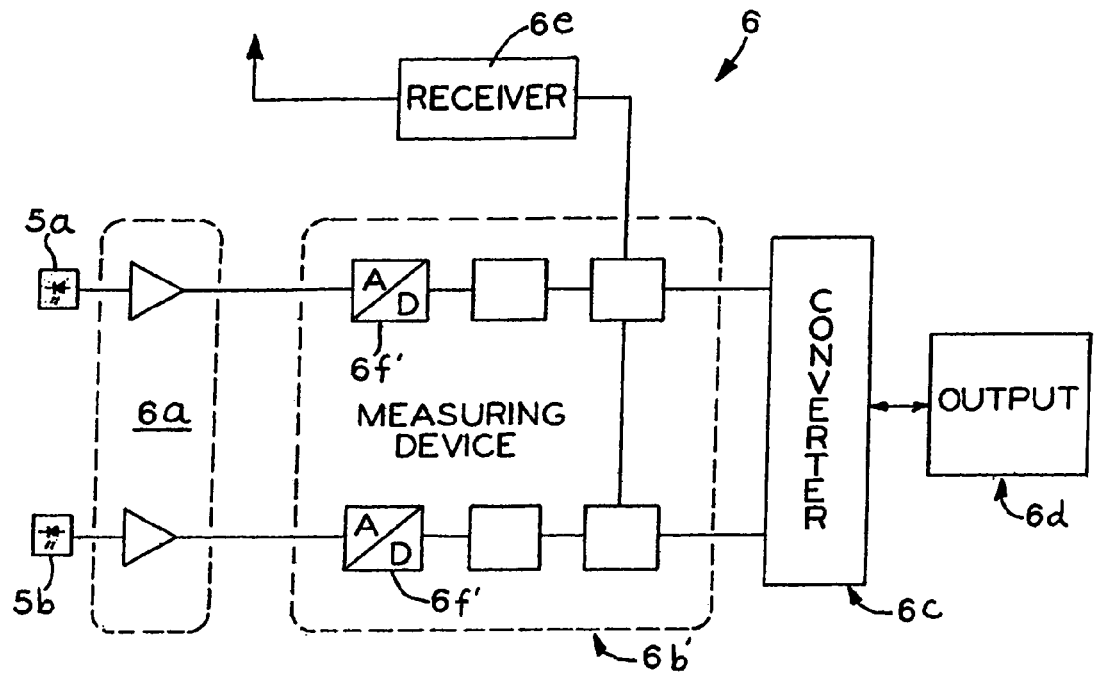
FIG. 2b a second principle draft for the representation with an alternative gating electronic of a measuring device according to the invention.

A further variation of the measuring device is shown in FIG. 2b as measuring device 6b'. In this variation, the signal received from the photodiode is quantized time-discrete and value-discrete after amplification through analog/digital converter 6f for the better determination of the impact of the laser beam on the signal receiver and the gravity center of the signal received with the transmission beam passage is algorithmically determined at the received digital data stream, in order to determine the point of passing through of the beam to this point of passing through of the gravity center. By determining the point of passing through of the gravity center as the point of passing through of the beam time, the temporal precision of the determination can be increased; in particular the precision is better than it is possible by the given sampling rate.

Furthermore the shown variation is arranged to conduct at the digital data stream a digital signal conditioning e.g. in form of an offset adjustment and/or by using an evaluation function (weighting function), e.g. a peripheral location attenuation, in order to achieve a further improved detection of the temporal beam passage. It is to be pointed out that it is possible to conduct a laser beam modulation at the signal generator for measurements with low signal levels. If desired, the required demodulation in the receiver can take place in a digital demodulation unit, assuming the presence of sufficiently high scanning rates during quantization.

A variation of the invention with only one beam is described with reference to FIG. 10.

The measuring device shown in FIG. 10a permits thereby a two-dimensional positioning with only one signal beam. The directed signal beam emitted by the signal generator normal to its axis of rotation scans in the course of a rotation a signal receiver 3d, which is equipped with three rod sensors 20 according to FIG. 4f. Rod sensors 20 are parallel to the rotation axis. The signal beam is here collimated and not widened fan-like.

The angles $\beta$, $\alpha 1$ and $\alpha 2$ come as crude data results from the time signature of the signal reception, whereby $\alpha 1$ and $\alpha 2$ are determined by measurement of the time intervals between the pulses of the signal beam detectors and $\beta$ is determined by determining the time difference between the measuring pulse at one detector 20 (preferably the middle detector) and the zero-angle reference signal.

A non-parallel position of the signal receiver to the rotation axis can be compensated in accordance with FIG. 10b. FIG. 10b shows the top view onto the active side of the signal beam receiver 3d. Thereby the three signal beam detector 20 are arranged parallel and with the distances $d_1$ and $d_2$ in one plane. The beam crosses signal beam receiver 3d on a path that is tilted with the angle $\delta$, so that the point of impact divides each light conductor in different ratio. In order to be able to determine now the points of impact of the signal beam in the local coordinate system $(x_s, y_s)$ of signal receiver 3d, this one-dimensional height information of rod sensors 20 must be analyzed. This can take place by means of analysis of the signal strengths on the two photodiodes located at the ends of each light conductor 20. As the distances $d_1$, $d_2$ are known, the base distances $b_1$, $b_2$ required for the determination of the distance r can now be calculated. This way the distance r can be calculated from $\alpha_1$ and $\alpha_2$ and the base distances $b_1$ and $b_2$.

Instead of the light conductor configuration are also different sensors, e.g. PSDs applicable.

A measuring device in accordance with FIG. 10 allows generally besides the determination of the distance r and the angle beta also a height measurement regarding the plane in the coverage area of the light conductor/PSDs, said plane created by the rotating signal beams.

Furthermore it is possible to conduct also the determination of the polar coordinates angle beta without taking reference on the transfer of an angle reference; the accurate position of the signal receiver relative to a signal generator can be determined nevertheless, in at least two coordinates (r, phi). For this a signal generator with almost constant rotational speed is used, which can also be for example an inexpensive, known rotating leveling laser. With the signal generator shown in FIG. 10 first a measurement is taken at a first position. Then the signal generator is offset by a well-known distance and a new measurement is taken with the signal receiver in this position. The well-known distance must only be known regarding its length, what can be detected easily from the time signature at the signal receiver, which is offset to the previous or desired second position of the signal generator. The determination of the polar coordinates takes then place through well-known trilateration. Before offsetting the signal generator measurements can be conducted in several positions by storage of the single measured values, whereby for these the measurements are to be repeated after offsetting the signal generator in order to be able to determine the positions of the measuring points altogether.

In an alternative way it is possible to use two signal generators right from the beginning. This is possible in particular if both signal generators can be differentiated at the receiver. This can take place via different rotational frequencies, coding of the emitted signals, selection of a suitable emission spectrum and similar. The distance of both signal generators, which are positioned randomly to each other, is then determined by conducting a measurement with the signal receiver for example on the connection line between the signal generators.

In a particularly preferred variation, inertial sensors are intended in the signal receiver, with which a movement of the signal receiver can be detected.

Background here is in particular that, in particular for measurements outdoors over long distances, measurement inaccuracies caused by refraction can occur from measurement to measurement due to the air turbulences. If it is detected whether and/or to what extent the signal receiver moved between two measurements, is possible it to make an averaging which increases the accuracy of the measurement. This can occur also with consideration of measured values taken under movement. If measured values are stored, which were detected at the measurement location during the movement, then the measuring accuracy can be increased by consideration of values, which were detected during the movement around that or to the measuring point under analysis of the trajectories determined with the inertial sensors or such. In place of the inertial sensors other motion sensors for the detection of movements, adjustment and/or acceleration can be intended. It is clearly understood that when designating such sensors also the movement of the signal receiver during a measurement can be compensated.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A signal processing circuit for a light receiver having at least one photo-sensitive component for repeatedly receiving a moving light beam, said signal processing circuit being adapted for receiving a signal derived from said photo-sensitive component and for determining the reception of said light beam on said photo-sensitive component, wherein said signal processing circuit comprises an analog/digital converter for quantizing a signal derived from said photo-sensitive component in a time and value discrete manner and for providing a stream of digital data related thereto, and said signal processing circuit being adapted to determine details of the beam transit over said photo-sensitive component from the quantized signal, wherein said details of the beam transit comprise a transit time determined from a temporal center of gravity of the beam passage, and wherein said transit time is calculated for beam transits of said moving light beam for beam shapes that are non-symmetric.

2. The signal processing circuit of claim 1, wherein the details of the beam transit further comprise the exact position of impact of the beam onto a position-sensitive photo-sensitive device in response to the data stream of time discretely and value discretely digitized signals.

3. A measuring system, comprising:

a signal receiver including a signal processing circuit, said signal processing circuit having at least one photo-sensitive component for repeatedly receiving a moving light beam, said signal processing circuit being adapted for receiving a signal derived from said photo-sensitive component and for determining the reception of said light beam on said photo-sensitive component, wherein said signal processing circuit comprises an analog/digital converter for quantizing a signal derived from said photo-sensitive component in a time and value discrete manner and for providing a stream of digital data related thereto, and said signal processing circuit being adapted to determine details of the beam transit over said photo-sensitive component from the quantized signal, wherein said details of the beam transit comprise a transit time determined from a temporal center of gravity of the beam passage, and wherein said transit time is calculated for beam transits of said moving light beam for beam shapes that are non-symmetric; and a signal generator for emitting at least two signal beams which scan a surface in relation to each other in a defined manner, said signal receiver being adapted to time resolve signal beams reception in order to enable the distance between a transmitter and a receiver to be determined from the time signature of signal beams.

4. The measuring system according to claim 3, wherein laser light beams are emitted as signal beams.

5. The measuring system according to claim 3, wherein the signal beams rotate around a common axis.

6. The measuring system according to claim 5, wherein the signal beams do not intersect at the rotation axis.

7. The measuring system according to claim 3, wherein the beam axes of the signal beams are stationary to each other in a fixed manner and have a constant angle relation.

8. The measuring system according to claim 3, wherein at least two of the signal beams are generally parallel to each other.

9. The measuring system according to claim 3, wherein at least three signal beams are provided.

10. The measuring system according to claim 3, wherein the signal generator is designed to emit a signal beam fan.

11. The measuring system according to claim 10, wherein at least two of the signal beam fans are arranged at least generally parallel to each other.

12. The measuring system according to claim 11, wherein a third signal beam fan is provided in such a manner that it is aligned diagonally to the two signal beams, said two signal beams being located at a measurable distance from each other, substantially parallel to each other, and wherein said third signal beam then is ananged in a plane which is tilted towards the rotation axes however is not normal to the rotation axes.

13. The measuring system according to claim 3, comprising a means to determine a signal beam zero-angle passage.

14. The measuring system according to claim 13, wherein the means to determine a signal beam zero-angle passage comprises a time based signal receiver and/or a zero-angle passage signal receiver, in particular adapted for the wireless reception of an identification signal for the zero-angle passage.

15. The measuring system according to claim 13, wherein the means to determine a signal beam zero-angle passage comprises a means for beam modulation/demodulation.

16. The measuring system according to claim 3, wherein a means for storing of a multiplicity of successive recorded coordinates is provided.

* * * * *

UNITED STATES PATENT AND TRADEMARK OFFICE
CERTIFICATE OF CORRECTION

PATENT NO. : 7,394,527 B2 Page 1 of 1
APPLICATION NO. : 11/510948
DATED : July 1, 2008
INVENTOR(S) : Mirko Essling et al.

It is certified that error appears in the above-identified patent and that said Letters Patent is hereby corrected as shown below:

In column 12, line 19, delete "ananged" and insert -- arranged --.

Signed and Sealed this

Twenty-sixth Day of August, 2008

JON W. DUDAS
*Director of the United States Patent and Trademark Office*